(12) United States Patent
Lai et al.

(10) Patent No.: US 8,151,039 B2
(45) Date of Patent: Apr. 3, 2012

(54) SYSTEM AND METHOD FOR CONTROLLING FLASH MEMORY WITHOUT USING READY/BUSY SIGNAL

(75) Inventors: Yi-Lin Lai, Taipei (TW); Fu-Sheng Huang, Taipei (TW); Woei-Harng Lin, Taipei (TW)

(73) Assignee: Moai Electronics Corporation, Hsinchu (TW)

( * ) Notice: Subject to any disclaimer, the term of this patent is extended or adjusted under 35 U.S.C. 154(b) by 332 days.

(21) Appl. No.: 12/581,845

(22) Filed: Oct. 19, 2009

(65) Prior Publication Data

US 2011/0093647 A1    Apr. 21, 2011

(51) Int. Cl.
*G06F 13/00* (2006.01)

(52) U.S. Cl. ............... 711/103; 711/154; 365/185.01; 365/185.05

(58) Field of Classification Search ............ 711/103, 711/154; 365/185.01, 185.05
See application file for complete search history.

(56) References Cited

U.S. PATENT DOCUMENTS

| | | | |
|---|---|---|---|
| 5,822,244 A * | 10/1998 | Hansen et al. | 365/185.11 |
| 2006/0048023 A1* | 3/2006 | Hobara | 714/718 |
| 2008/0266956 A1* | 10/2008 | Byeon et al. | 365/185.09 |
| 2009/0164703 A1* | 6/2009 | Racino et al. | 711/103 |
| 2009/0168525 A1* | 7/2009 | Olbrich et al. | 365/185.11 |

* cited by examiner

*Primary Examiner* — Hong Kim
(74) *Attorney, Agent, or Firm* — Lin & Associates IP, Inc.

(57) ABSTRACT

A system and method for controlling flash memory is provided for a flash memory controller to use a control interface to read the state register of at least a flash memory with received data for operation to detect whether the flash memory has already finished the operation on the received data without using an RB signal, and when the operation on the received data is to read, the controller can execute the state data switch so that the IO of flash memory can output correct flash memory data for read, or when the operation on the received data is to write, the controller can execute another data operation to save time and accelerate the data operation speed of the flash memory.

10 Claims, 8 Drawing Sheets

SYSTEM AND METHOD FOR CONTROLLING FLASH MEMORY WITHOUT USING READY/BUSY SIGNAL

FIELD OF THE INVENTION

The present invention generally relates to a system and method for controlling flash memory, and more specifically to an operation to directly read the state information of the bits in the state register without using ready/busy signal to execute the page read and write.

BACKGROUND OF THE INVENTION

Flash memory has the advantages of data retention, high reliability, suitable for large amount of data read and write; hence, flash memory is widely used as data storage, such as, video or audio data. Currently, flash memory is applied to a wide range of consumer electronic products, such as, thumb memory stick, digital camera, digital video camera, mobile phone, and so on.

For the convenience of description, the following uses the Intel NAND flash memory as example. Refer to Intel NAND Flash memory Specification for details.

Figure 1:
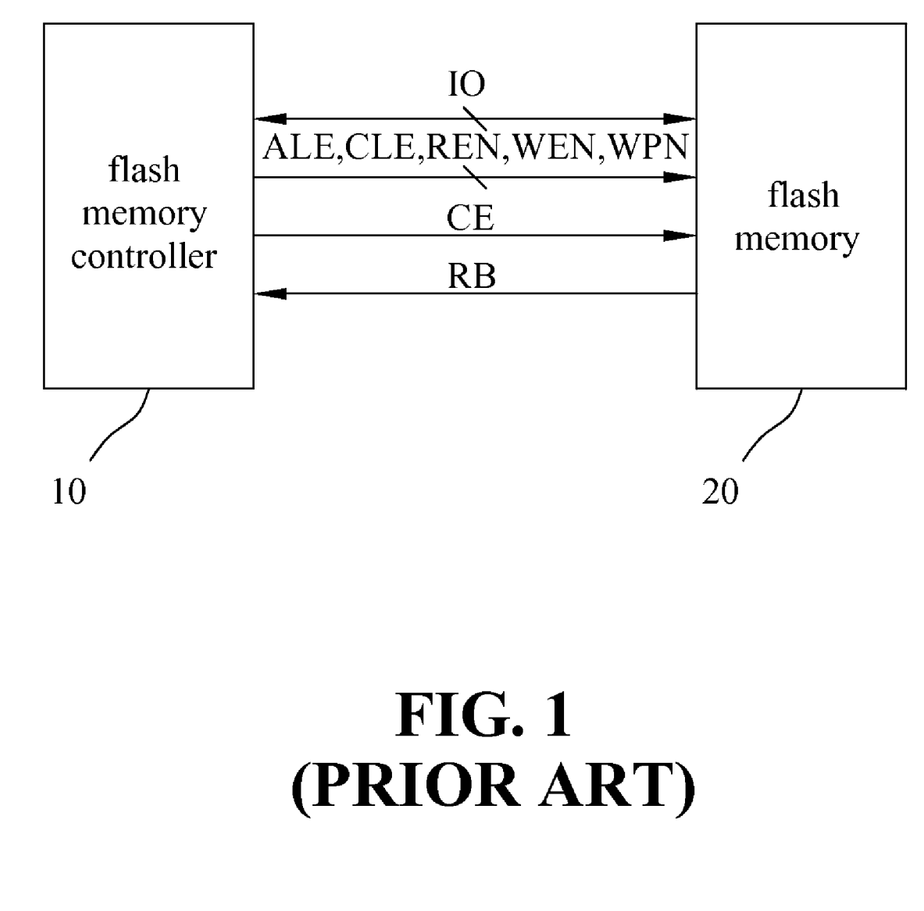
FIG. 1 shows a schematic view of a conventional system for controlling flash memory.

FIG. 1 shows a schematic view of a conventional system for controlling flash memory. As shown in FIG. 1, a conventional flash memory control system includes a flash memory controller 10 and flash memory 20. The control interface includes a ready/busy (RB) signal, a chip enable (CE) signal, an address latch enable (ALE) signal, a command latch enable (CLE) signal, a read enable (REN) signal, a write enable (WEN) signal, a write protect (WPN) and an input/output (IO) bus.

Figure 2:
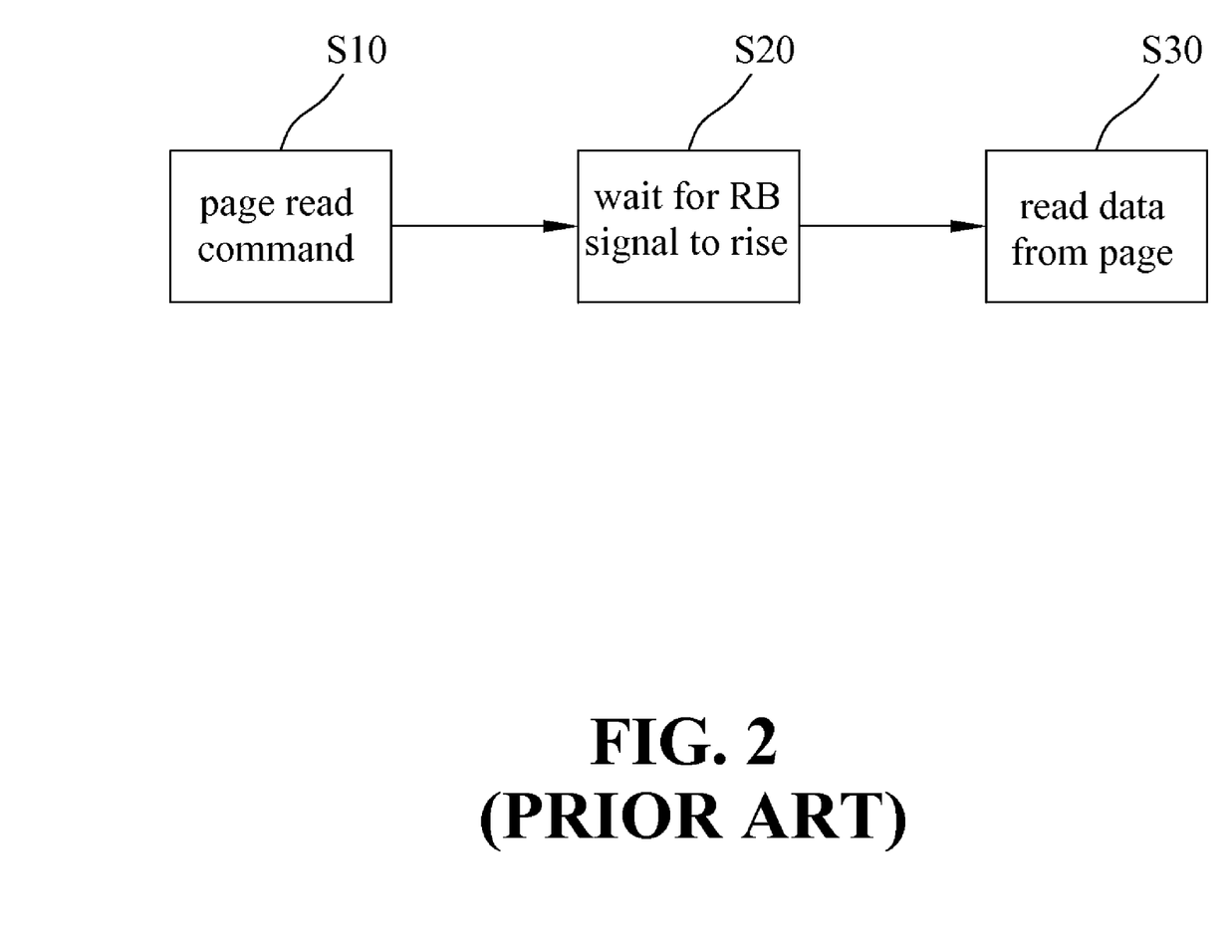
FIG. 2 shows a flowchart of a conventional technique for a page read operation.
Figure 3:
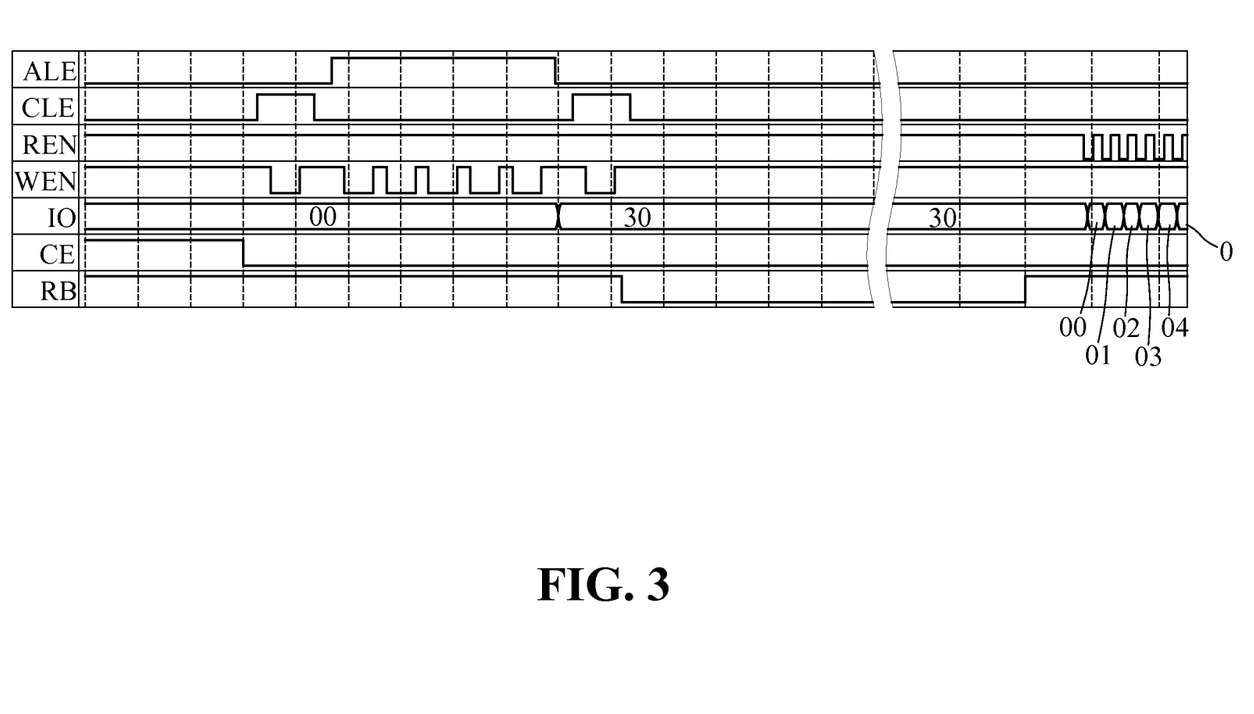
FIG. 3 shows a schematic view of the waveform of a conventional technique for the page read operation.

FIG. 2 shows a flowchart of a conventional page read operation. As shown in FIG. 2, the operation of page read by flash memory controller 10 on flash memory 20 starts with step S10. In step S10, flash memory controller 10 uses the control interface to transmit the page read command, including command code 00h and 20h on IO. Step S20 is to wait for RB to rise, because flash memory 20 is not ready for page read operation when RB is dragged to low level by flash memory 20. Therefore, IO does not have the page read data. Once flash memory 20 releases RB, RB will be raised by an external resistor to high level. Step S30 is to execute page read operation to read the data of the entire page. In step S30, REN is dragged to low level and the correct data is captured on IO. REN can be repeatedly raised up and dragged down to read the data of the entire page, as shown in FIG. 3, which illustrates a waveform of a conventional page read operation.

However, the rising time for RB is very long, usually requiring the time for the flash memory to be lowered to a low level (typically of 25 µs-50 µs, depending on the flash memory) plus the time for the external pull-up resistor to pull up to the high level after flash memory is released (usually 3 µs, depending on the pull-up resistor). Furthermore, for high capacity flash memory comprising a plurality of physical flash memories, a plurality of RB signals are required, leading to the increase of the number of pins and affecting the circuit layout. Therefore, the flash memory manufacturers usually suggest the use of state bits in the internal register to determine whether the flash memory is ready for page read, instead of the RB signal mechanism.

Figure 4:
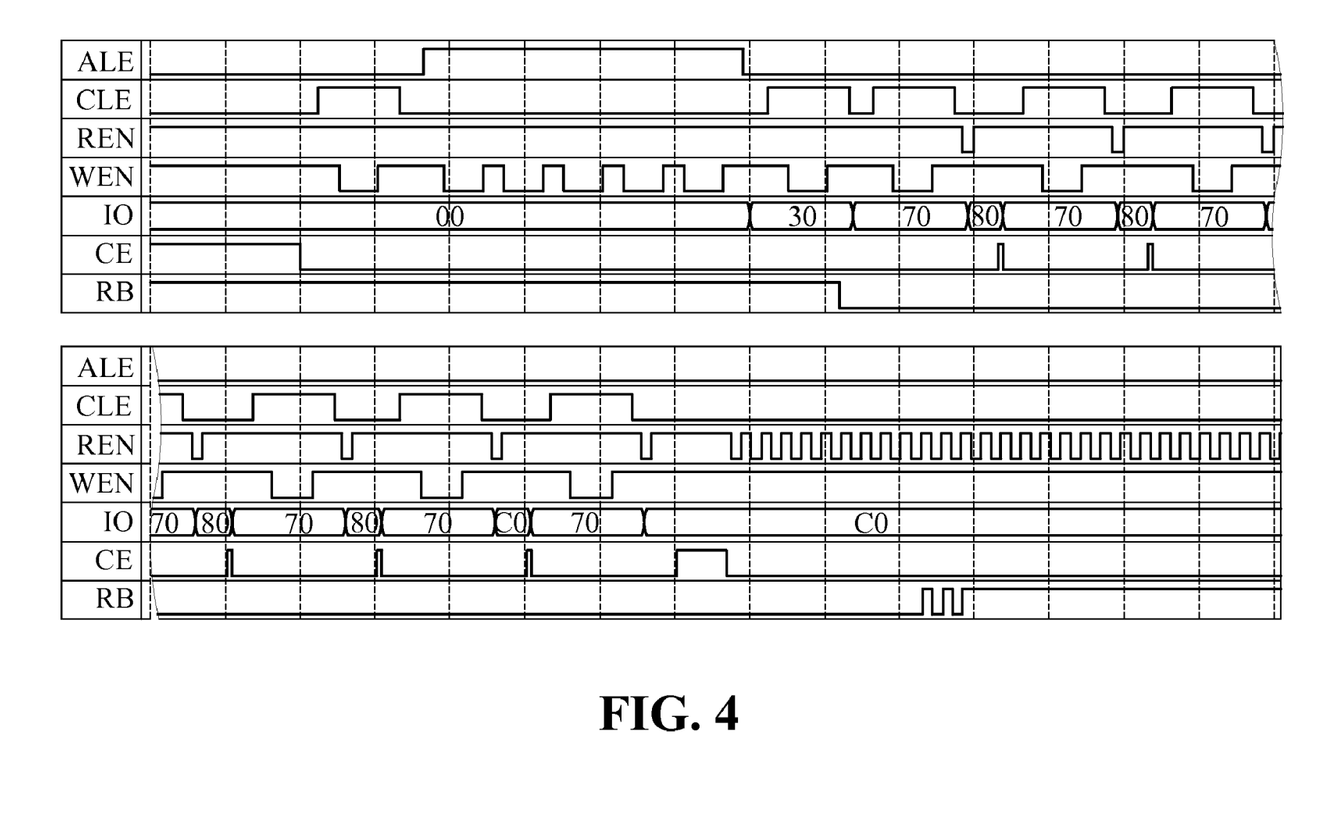
FIG. 4 shows another schematic view of a conventional technique for the page read operation.

FIG. 4 shows a schematic view of another waveform of a page read operation. As shown in FIG. 4, without referring to RB signal, the state bit of the state register is read to determine whether the page read can be performed. If the read state is at high level, the page read can be performed; otherwise, if at low level, the state bit must be continuously read and tested. However, when the state bit is at high level, and REN signal is lowered to low level to capture the memory data on IO, IO cannot display the correct memory data; instead, the previous contents of state register are displayed. Therefore, the conventional page read technique cannot perform without the RB signal.

It is therefore imperative to devise a method for controlling flash memory so that the page read can be read without the RB signal to solve the aforementioned problems.

SUMMARY OF THE INVENTION

The primary object of the present invention is to provide a system for controlling flash memory so that the flash memory controller can, without using the RB signal, use a control interface to read the state register of at least a flash memory with received data for the operation to detect whether the flash memory has already finished the operation on the received data, and when the operation on received data is to read, the controller can execute the state data switch so that the IO of flash memory can output correct flash memory data for read, or when the operation on received data is to write, the controller can execute another data operation to save time and accelerate the data operation speed of the flash memory.

Another object of the present invention is to provide a method for controlling flash memory so that, without using the RB signal of the flash memory, the method can directly read the state register of the flash memory and subsequently executes the state data switch for the IO of flash memory to output the correct flash memory data. Then, the REN signal is repeatedly lowered to the low level and raised to the high level so that the memory data can be captured serially on the IO of the flash memory, where the state data switch is executed when the state bit of the state register is at high level.

Yet another object of the present invention is to provide a method for controlling flash memory so that, without using an RB signal, the method can input write command to read the state register of the flash memory to determine whether the flash memory has finished the write command and input another write or read command so as to improve the operation speed and overall efficiency of the read and write to the flash memory.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

The system for controlling flash memory for the present invention includes a flash memory controller and at least a flash memory. A control interface exists between the flash memory controller and the flash memory. The control interface includes at least a chip enable (CE) signal, at least an address latch enable (ALE) signal, at least a command latch enable (CLE) signal, at least a read enable (REN) signal, at least a write enable (WEN) signal, at least a write protect (WPN) and at least an input/output (IO) bus, where the flash memory controller can use the control interface to read the state register of a flash memory with received data for the operation to detect whether the flash memory has already finished the operation on the received data, and whether the operation is to read or write.

The main feature of the system for controlling flash memory of the present invention is that, without using the RB signal as in conventional technique, the system can detect whether the flash memory has finished the data operation. When the operation on received data is to read, the controller can execute the state data switch so that the IO of flash memory can output correct flash memory data for read, or when the operation on received data is to write, the controller can execute another data operation to save time and accelerate the data operation speed of the flash memory.

Figure 5:
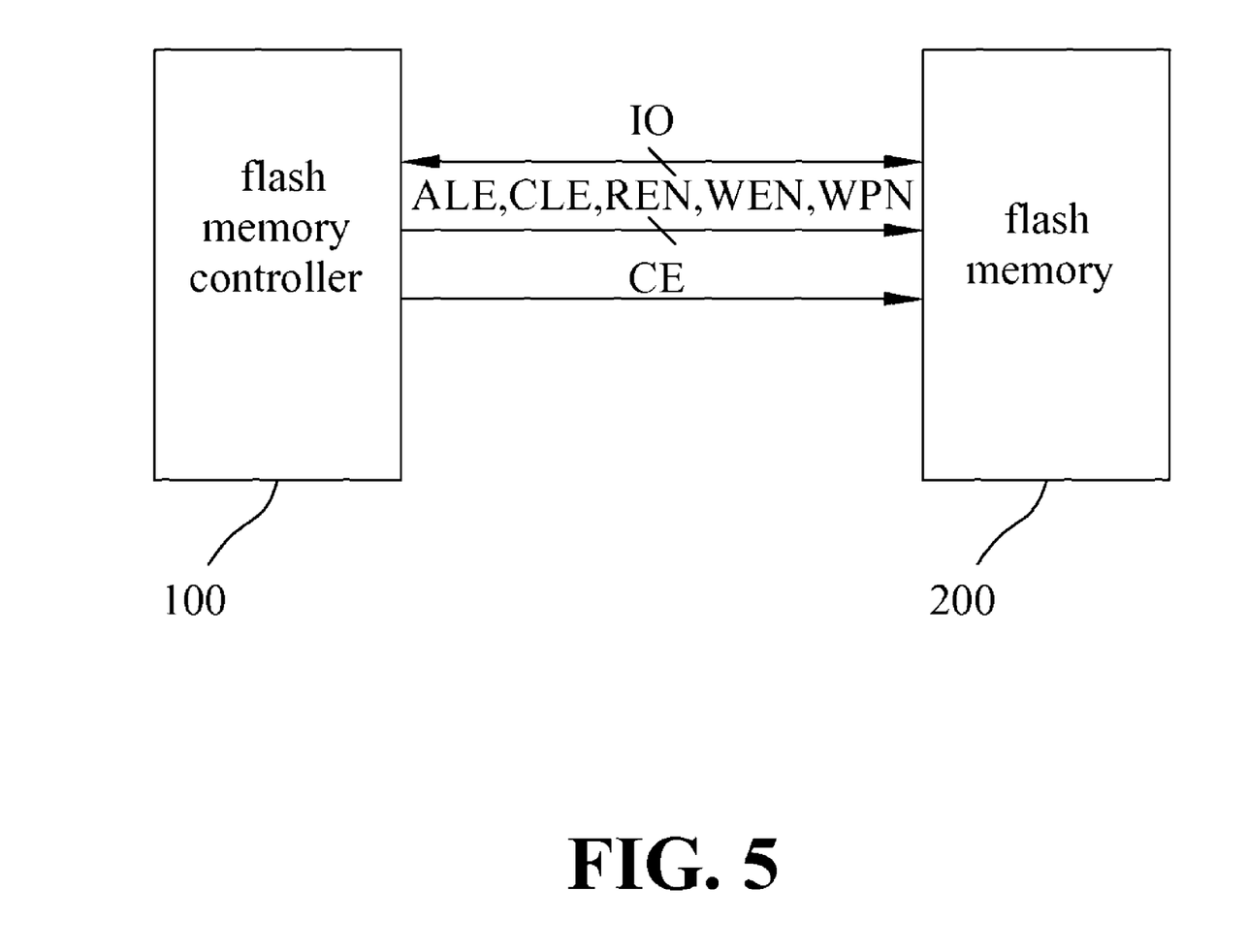
FIG. 5 shows a schematic view of a system for controlling flash memory according to the present invention.

FIG. 5 shows a schematic view of the system for controlling flash memory according to the present invention. As shown in FIG. 5, the system includes a flash memory controller 100 and at least a flash memory 200. A control interface exists between flash memory controller 100 and flash memory 200. The control interface includes at least a chip enable (CE) signal, at least an address latch enable (ALE) signal, at least a command latch enable (CLE) signal, at least a read enable (REN) signal, at least a write enable (WEN) signal, at least a write protect (WPN) and at least an input/output (IO) bus so as to realize the read and write operation to flash memory 200 without using the RB signal as in the conventional technique, where the read data operation includes page read, page read cache mode, random data out and two-plane page read, and the write data operation includes page write, page write cache mode, random data in, and two-plane page write.

It is worth noting that the above control signals are exemplary embodiments using Intel NAND flash memory for explanation. The control interfaces from other suppliers are also within the scope of the present invention. The main feature of the present invention is without using the RB signal of flash memory 200 so as to save the pin number, simplify the circuit layout, as well as accelerating the page read and page write operation and improving the overall efficiency by reading the operation in the internal register of flash memory 200 in combination with the subsequent state data switch.

In addition, to clarify the explanation, the embodiment of the present invention shows only a flash memory 200, and a corresponding set of control signals in the control interface, such as, CE, ALE, CLE, REN, WEN, WPN, and IO. The simplification is only for demonstrative, but not restrictive, purpose, The following uses page read as an exemplar to describe the details of the present invention with respect to the page read operation.

Figure 6:
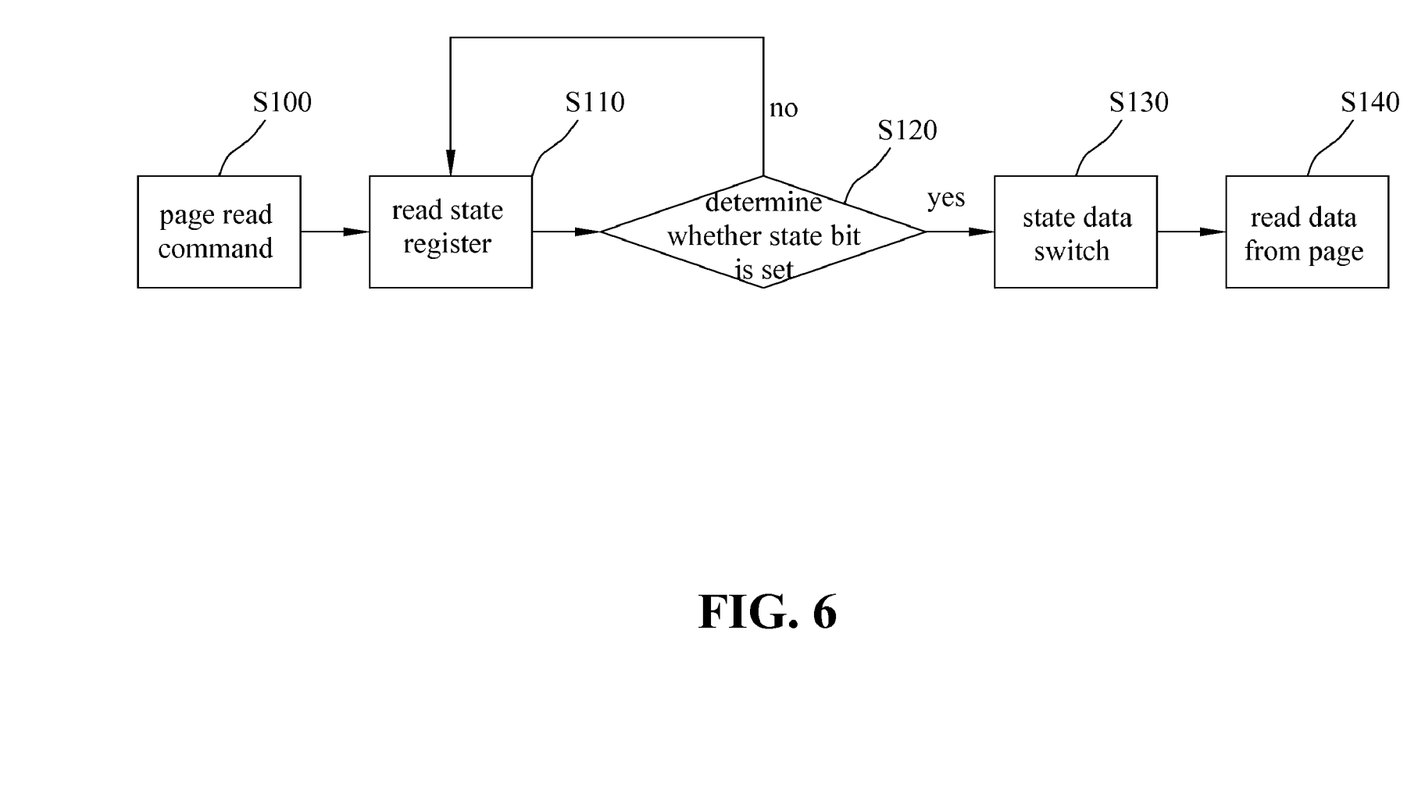
FIG. 6 shows a flowchart for the page read operation using the method for controlling flash memory according to the present invention.
Figure 7:
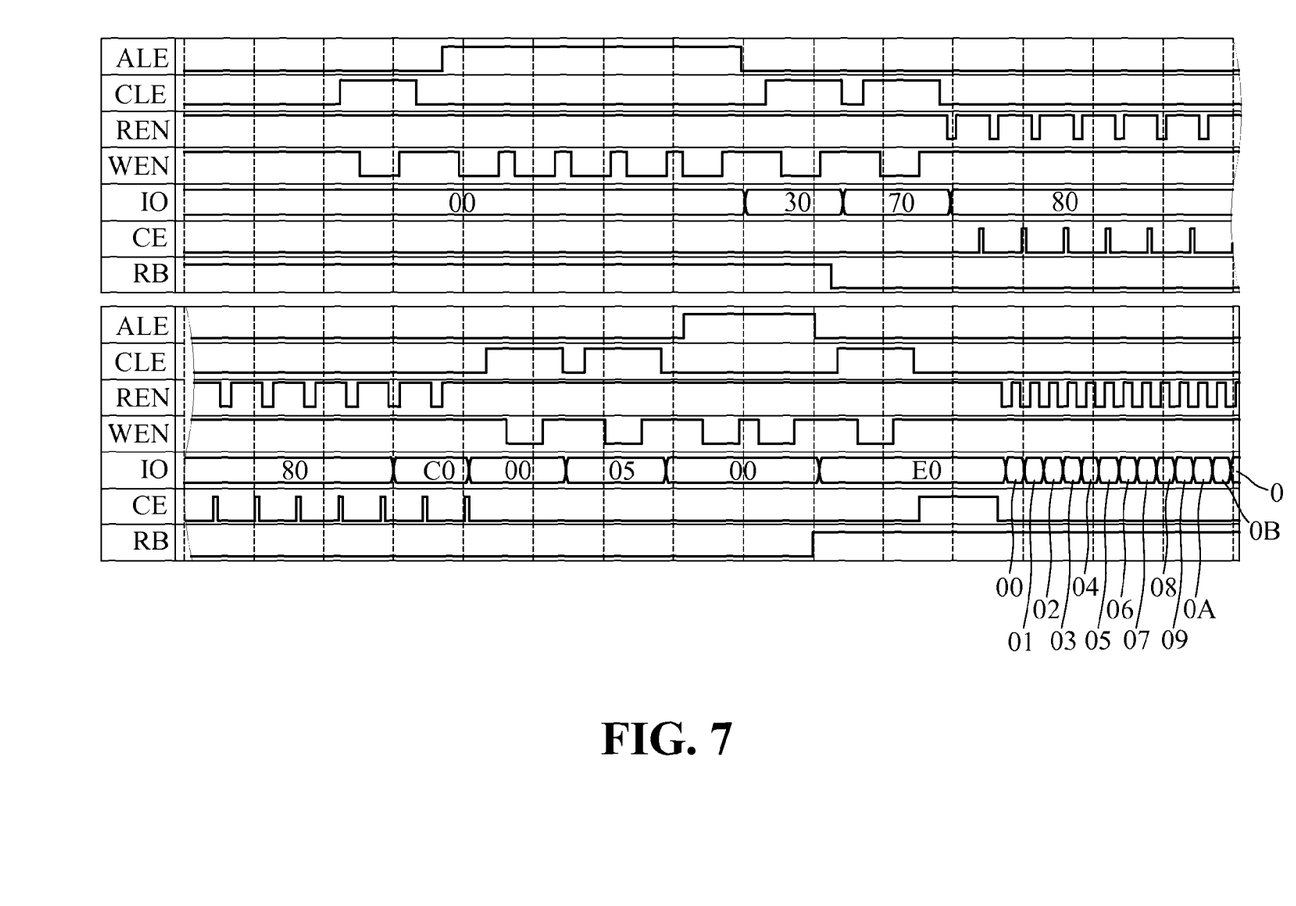
FIG. 7 shows a schematic view of the waveform for the page read operation using the method for controlling flash memory according to the present invention.

FIG. 6 shows a flowchart of the page read operation according to the present invention. As shown in FIG. 6, the method for controlling flash memory in the page read operation starts with S100. In step S100, flash memory controller 100 uses a control interface to transmit the page read command, including the command code 00h and 30h on IO. FIG. 7 shows a schematic view of the waveform of the page read operation according to the present invention.

Step S110 is to read the state register of flash memory 200, including command code 70h on IO, and then to lower the REN signal to the low level for capturing the value of the state register on IO, shown as 80h on IO of FIG. 7.

Step S120 is to determine the level of the state bit of the state register. In the present embodiment, the state bit is bit 6, and the levels of the state bit depend on the design of flash memory 200. If the state bit is at the first level, it means that the page read operation of flash memory 200 is not ready, and the process returns to step S110. If the state bit is at the second level, it means that the page read operation of flash memory 200 is ready, and the process enters step S130. The first level can be low level and the second level can be high level. Alternatively, the first level can be high level and the second level can be low level.

Step S130 is to execute the state data switch, including serially inputting a plurality of commands, such as random data out, and the random data out command includes inputting a first command code, such as 05h, a memory address, such as ooh, and a second command code, such as E0h, to the IO, while setting correct control signals, such as, CE, ALE, CLE and WEN of FIG. 7. The state data switch operation further includes a starting command before the random data out command, the starting command includes command code 00h and has at least a time length of a system cycle.

It is worth noting that any combination of the above starting command and the random data out command, or any combination of the starting command, the random data out command and other commands are all within the scope of the present invention.

Step S140 is to execute page read, i.e., repeatedly lowering REN to low level and raising it to high level so as to capture the correct memory data on IO to accomplish the page read operation.

The following uses a page write operation as an exemplar to describe the method according to the present invention.

Figure 8:
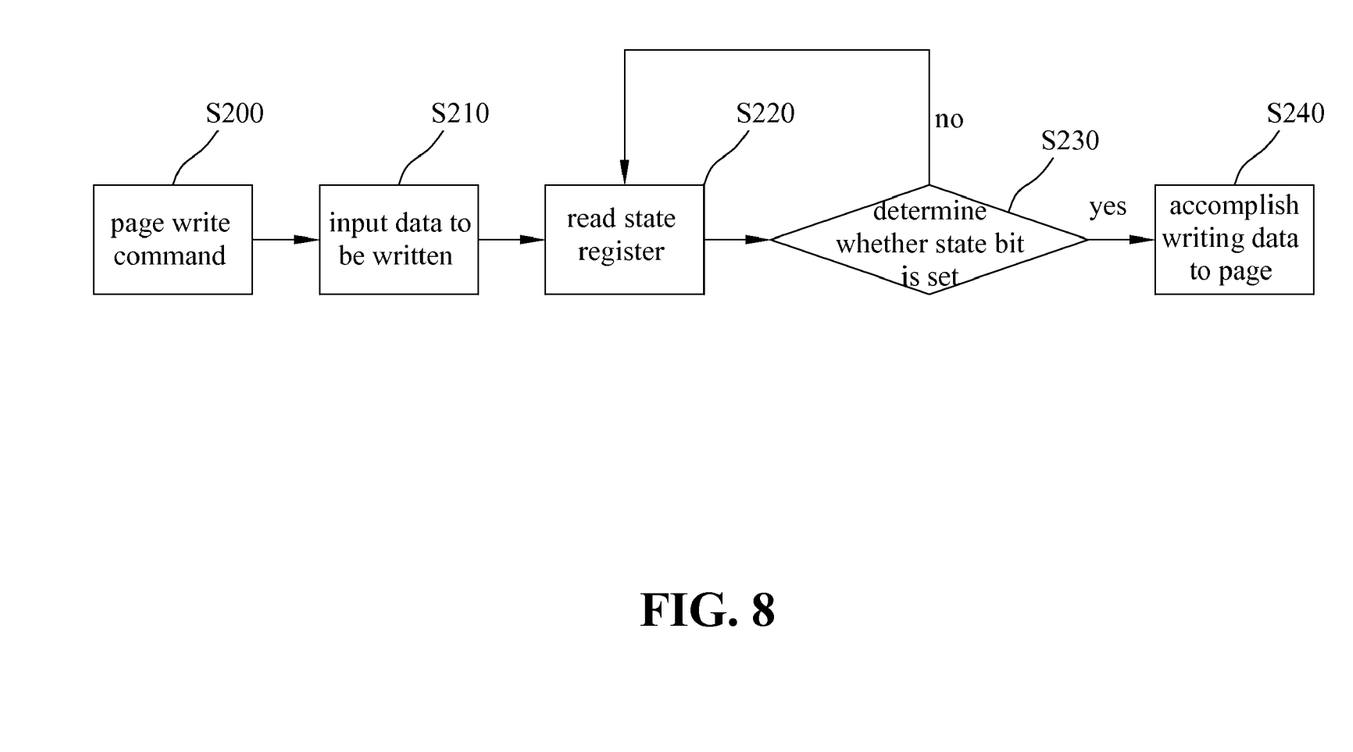
FIG. 8 shows a flowchart for the page write operation sing the method for controlling flash memory according to the present invention.

FIG. 8 shows a flowchart of the page write operation according to the method for controlling flash memory of the present invention. As shown in FIG. 8, the page write operation starts with step S200. Step S200 is to input the page write command and enters step S210, inputting the data for the entire page. Step S220 is to read the state register and then enters step S230 to determine whether the page write command has finished. If the state bit is at low level, the process returns to step S220; otherwise, the process enters step S240 to accomplish the page write operation. In this manner, the write operation of the present invention does not have to wait for the rising of RB signal of flash memory 200 to high level; hence, the method can determine rapidly whether the write page command is finished, and proceeds to the next page read or page write command so as to accelerate the speed and improve the overall efficiency.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for controlling flash memory, using a flash memory controller to perform a data read operation on a flash memory to read data, and a control interface existing between said flash memory and said flash memory controller, said control interface comprising: a ready/busy (RB) signal, a chip enable (CE) signal, an address latch enable (ALE) signal, a command latch enable (CLE) signal, a read enable (REN) signal, a write enable (WEN) signal, a write protect (WPN) and an input/output (IO) bus, wherein said method realizes said data read operation without using said RB signal, and comprises the steps of:
  (a) using said control interface to transmit a read command to said flash memory;
  (b) reading a state register of said flash memory, said state register comprising a state bit, said state bit indicating whether said flash memory has finished said read command or not;
  (c) determining level of said state bit, if said state bit is at a first level, returning to step (b), and if said state bit is at a second level, proceeding to step (d);
  (d) performing a state data switch on said flash memory;
  (e) repeatedly lowering said REN signal to low level and raising said REN signal to high level to capture memory data on said IO; and
  (f) accomplishing said data read operation;
  wherein said state data switch in step (d) comprises serially inputting a plurality of commands including a random data out command.

2. The method as claimed in claim 1, wherein said data read operation is one of page read operation, page read cache mode operation, random data out operation and two-plane page read operation.

3. The method as claimed in claim 1, wherein said first level is high level, and said second level is low level.

4. The method as claimed in claim 1, wherein said first level is low level, and said second level is high level.

5. The method as claimed in claim 1, wherein said random data out command comprises inputting a first command code, a memory address and a second command code to said IO.

6. The method as claimed in claim 1, wherein state data switch further comprises a starting command before said random data out command, said starting command comprises command code 00h, and has at least a time length of system cycle.

7. A method for controlling flash memory, using a flash memory controller to perform a data write operation on a flash memory to write data into said flash memory, and a control interface existing between said flash memory and said flash memory controller, said control interface comprising: a ready/busy (RB) signal, a chip enable (CE) signal, an address latch enable (ALE) signal, a command latch enable (CLE) signal, a read enable (REN) signal, a write enable (WEN) signal, a write protect (WPN) and an input/output (IO) bus, wherein said method realizes said data write operation without using said RB signal, and comprises the steps of:
  (a) using said control interface to transmit a write command to said flash memory;
  (b) reading a state register of said flash memory, said state register comprising a state bit, said state bit indicating whether said flash memory has finished said write command or not;
  (c) determining level of said state bit, if said state bit is at a first level, returning to step (b), and if said state bit is at a second level, proceeding to step (d); and
  (d) accomplishing said data write operation.

8. The method as claimed in claim 7, wherein said data write operation is one of page write operation, page write cache mode operation, random data in operation and two-plane page write operation.

9. The method as claimed in claim 7, wherein said first level is high level, and said second level is low level.

10. The method as claimed in claim 7, wherein said first level is low level, and said second level is high level.

* * * * *